United States Patent
Yazawa et al.

(12)

(10) Patent No.: US 8,539,861 B2
(45) Date of Patent: Sep. 24, 2013

(54) MOVABLE BLADE NOT IMPAIRING DURABILITY OF STATIONARY BLADE, PAPER SHEET CUTTING DEVICE WITH MOVABLE BLADE, AND PRINTER WITH PAPER SHEET CUTTING DEVICE

(75) Inventors: Shou Yazawa, Kawasaki (JP); Yukio Yoshioka, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/634,812

(22) PCT Filed: Feb. 24, 2011

(86) PCT No.: PCT/JP2011/054823
§ 371 (c)(1),
(2), (4) Date: Oct. 31, 2012

(87) PCT Pub. No.: WO2012/029338
PCT Pub. Date: Mar. 8, 2012

(65) Prior Publication Data
US 2013/0039686 A1 Feb. 14, 2013

(30) Foreign Application Priority Data
Aug. 31, 2010 (JP) .................. 2010-193168

(51) Int. Cl.
*B23P 15/40* (2006.01)
*B41J 11/70* (2006.01)
*B26D 1/08* (2006.01)

(52) U.S. Cl.
CPC ............ *B23P 15/40* (2013.01); *B26D 1/085* (2013.01); *B41J 11/703* (2013.01)
USPC ............ 76/104.1; 76/116; 400/621; 29/557

(58) Field of Classification Search
CPC ......... B41J 11/703; B23P 15/40; B26D 1/085
USPC .............. 29/577, 557; 400/621; 76/104.1, 76/106.5, 116
IPC .................................... B26D 1/08; B23P 15/40
See application file for complete search history.

(56) References Cited

U.S. PATENT DOCUMENTS

| 2,705,534 | A | * | 4/1955 | Ingersoll | 83/693 |
| 3,213,514 | A | * | 10/1965 | Evans | 29/14 |
| 6,152,007 | A | | 11/2000 | Sato | |
| 8,267,603 | B2 | * | 9/2012 | Morita et al. | 400/621 |
| 2005/0207818 | A1 | | 9/2005 | Tsuchiya et al. | |

FOREIGN PATENT DOCUMENTS

| JP | 10-217182 | A | | 8/1998 |
| JP | 2001-239494 | A | | 9/2001 |
| JP | 2002205223 | A | * | 7/2002 |
| JP | 2003-225887 | A | | 8/2003 |
| JP | 2004-209572 | A | | 7/2004 |
| JP | 2005-271204 | A | | 10/2005 |
| JP | 2009107090 | A | * | 5/2009 |

* cited by examiner

Primary Examiner — Daniel J Colilla
(74) Attorney, Agent, or Firm — Sughrue Mion, PLLC

(57) ABSTRACT

Provided is a movable blade including, at a part including a movable blade leading edge which engages with a stationary blade, a blade edge portion which is thinned toward the movable blade leading edge. The blade edge portion is formed by shaving.

2 Claims, 6 Drawing Sheets

MOVABLE BLADE NOT IMPAIRING DURABILITY OF STATIONARY BLADE, PAPER SHEET CUTTING DEVICE WITH MOVABLE BLADE, AND PRINTER WITH PAPER SHEET CUTTING DEVICE

CROSS REFERENCE TO RELATED APPLICATIONS

This application is a National Stage of International Application No. PCT/JP2011/054823, filed on Feb. 24, 2011, which claims priority from Japanese Patent Application No. 2010-193168, filed Aug. 31, 2010, the contents of all of which are incorporated herein by reference in their entirety.

TECHNICAL FIELD

This invention relates to a sheet cutting device, which is mounted to a printer for performing printing on a sheet such as roll paper and a label sheet, and is configured to automatically cut a printed sheet with a stationary blade and a movable blade.

BACKGROUND ART

Referring to FIG. 1, a sheet cutting device of this type includes a stationary blade unit 10 and a movable blade unit 20 which are opposed to each other across front and back surfaces of a sheet S that has been subjected to printing in a sheet passage inside a printer.

The stationary blade unit 10 includes a frame 11, a stationary blade 12 supported by the frame 11, and a plate spring 13 for pressurizing the stationary blade 12 in a direction toward the movable blade.

The movable blade unit 20 includes a frame 21, a movable blade 72 supported so as to be movable in a vertical direction of FIG. 1 inside the frame 21, a rack 23 fixed to the movable blade, and a pinion gear 24 connected to a drive source (not shown), for driving the rack in the vertical direction of FIG. 1.

This cutting device operates as follows. The sheet S conveyed from the right to left of FIG. 1 is temporarily stopped, and when the pinion gear 24 of the movable blade unit 20 is rotated in the J direction of FIG. 1 by driving a stepper motor and the like (not shown), the movable blade 72 fixed to the rack 23 which meshes with the pinion gear 24 moves (ascends) in the K direction of FIG. 1. The stationary blade 12 and the movable blade 72 are provided in a press-contact state to each other. The sheet S is cut by the principle of scissors, and the cut sheet is discharged from a discharge port of the printer.

By the way, the movable blade 72 includes, at a movable blade leading edge part which engages with the stationary blade 12, a blade edge portion 72a that is thinned toward the movable blade leading edge.

Such a blade edge portion is formed as follows. First, the outer shape of the movable blade is formed by punching. Subsequently, a tool for cutting or grinding, which is a type of a rotation-type file, is obliquely pressed against an end surface of a punched metal plate material, which corresponds to the movable blade leading edge, and cutting or grinding is performed. With this, the blade edge portion 72a as illustrated in FIGS. 2A and 2B is formed.

Besides the movable blade illustrated in FIGS. 2A and 2B, the movable blade including the blade edge portion formed by cutting or grinding is also disclosed in, for example, Related Art Document 1 (Japanese Unexamined Patent Application Publication (JP-A) No. 2003-225887) and Related Art Document 2 (Japanese Unexamined Patent Application Publication (JP-A) No. Hei 10-217182). In the technology disclosed in Related Art Document 1, a blade edge portion called a V-shaped blade portion is formed by grinding. Further, it is also found in the technology disclosed in Related Art Document 2 that, although not clearly described, the blade edge portion is formed by grinding.

However, the type of the rotation-type file to be used in cutting or grinding has a pinpoint and narrow work range. Therefore, the cutting or the grinding is performed by gradually moving such a tool in a width direction of the blade edge portion, which requires a long period of work time and reduces the productivity.

Further, the movable blade generally includes a pair of guide portions for guiding the engagement with the stationary blade at the time of cutting. However, as illustrated in FIG. 2C, the tool for cutting or grinding cannot be pressed against a root part of each guide portion 72c, and hence the blade edge portion 72a cannot be formed to a maximum extent in the width direction of the movable blade. In this case, the roots of the guide portions are thicker than the blade edge portion, and hence, at the time of cutting, the roots of the guide portions may hit the stationary blade more strongly than the blade edge portion, which causes this portion of the stationary blade to be worn greater than the other part (uneven wear). Thus, there is a risk that the durability of the stationary blade is impaired.

Further, as illustrated in FIG. 2B, the tool for cutting or grinding cannot be pressed against the inner side of a non-cutting portion 72b for performing partial cutting of a sheet as well, and hence the blade edge portion cannot be formed in the non-cutting portion 72b. Note that, the non-cutting portion 72b does not cut the sheet at the time of partial cutting, but by controlling the movable blade 72 to increase its stroke, the sheet is completely cut in some cases. Therefore, it is desired that the blade edge portion be formed also in the non-cutting portion 72b.

DISCLOSURE OF THE INVENTION

It is therefore an object of this invention to provide a movable blade which includes a blade edge portion that can be formed in a short period of time, has excellent productivity, and does not impair the durability of a stationary blade by uneven wear.

It is another object of this invention to provide a sheet cutting device including the movable blade as described above.

It is still another object of this invention to provide a printer including the sheet cutting device as described above.

According to this invention, there is provided a movable blade, which is applicable to a sheet cutting device for cutting a printed sheet, the sheet cutting device being mounted to a printer for performing printing on a sheet, the movable blade cutting the printed sheet through engagement with a stationary blade, the movable blade including, at a part including a movable blade leading edge which engages with the stationary blade, a blade edge portion which is thinned toward the movable blade leading edge, in which the blade edge portion is formed by shaving.

The movable blade may further include a non-cutting portion recessed from the movable blade leading edge at a center part of the movable blade in a width direction, which corresponds to a width direction of the sheet, the non-cutting portion preventing cutting of the sheet partially. The non-cutting portion may be subjected to the shaving as well in the same step as the blade edge portion.

The movable blade may further include a pair of guide portions protruded from the movable blade leading edge at both ends of the movable blade in the width direction, which corresponds to the width direction of the sheet, the pair of guide portions guiding the engagement with the stationary blade at the time of cutting. The pair of guide portions may be subjected to the shaving as well in the same step as the blade edge portion.

The movable blade may further include: a sliding region which slides against the stationary blade, and a non-sliding region; and a pair of cutout portions formed at both sides of the movable blade in the width direction across the sliding region and the non-sliding region, the pair of cutout portions being formed deeper toward an inner side of the movable blade in the width direction as separating from the movable blade leading edge.

Further, according to this invention, there is provided a sheet cutting device, including: a stationary blade; and the above-mentioned movable blade, the sheet cutting device being configured to cut a printed sheet through engagement between the stationary blade and the movable blade.

Still further, according to this invention, there is provided a printer, including: a configuration for performing printing on a sheet; and the above-mentioned sheet cutting device.

Yet further, according to this invention, there is provided a method of manufacturing a movable blade, which is applicable to a sheet cutting device for cutting a printed sheet, the sheet cutting device being mounted to a printer for performing printing on a sheet, the movable blade cutting the printed sheet through engagement with a stationary blade, the method including forming, at a part including a movable blade leading edge which engages with the stationary blade, a blade edge portion which is thinned toward the movable blade leading edge, in which the forming includes forming the blade edge portion by shaving.

The movable blade may further include a non-cutting portion recessed from the movable blade leading edge at a center part of the movable blade in a width direction, which corresponds to a width direction of the sheet, the non-cutting portion preventing cutting of the sheet partially. The method may further include subjecting the non-cutting portion to the shaving as well in the same step as the blade edge portion.

The movable blade may further include a pair of guide portions protruded from the movable blade leading edge at both ends of the movable blade in the width direction, which corresponds to the width direction of the sheet, the pair of guide portions guiding the engagement with the stationary blade at the time of cutting. The method may further include subjecting the pair of guide portions to the shaving as well in the same step as the blade edge portion.

The movable blade may further include: a sliding region which slides against the stationary blade, and a non-sliding region. The method may further include forming a pair of cutout portions at both sides of the movable blade in the width direction across the sliding region and the non-sliding region, the pair of cutout portions being formed deeper toward an inner side of the movable blade in the width direction as separating from the movable blade leading edge, the forming the pair of cutout portions preceding the shaving.

BEST MODE FOR EMBODYING THE INVENTION

A movable blade of this invention is applicable to a sheet cutting device for cutting a printed sheet, the sheet cutting device being mounted to a printer for performing printing on a sheet, the movable blade cutting the printed sheet through engagement with a stationary blade. The movable blade includes, at a part including a movable blade leading edge which engages with the stationary blade, a blade edge portion which is thinned toward the movable blade leading edge.

In particular, in the movable blade, the blade edge portion is formed by shaving.

With the above-mentioned configuration, the movable blade includes the blade edge portion that can be formed in a short period of time by one shaving, and has an excellent productivity. Further, the blade edge portion is formed up to the root of a guide portion and in a non-cutting portion, which has been impossible or difficult in the conventional case. Therefore, uneven wear of the stationary blade can be suppressed.

In the following, movable blades according to embodiments of this invention are described with reference to the drawings.

First Embodiment

In the following, a movable blade according to an embodiment of this invention is described with reference to the drawings.

Figure 3A:
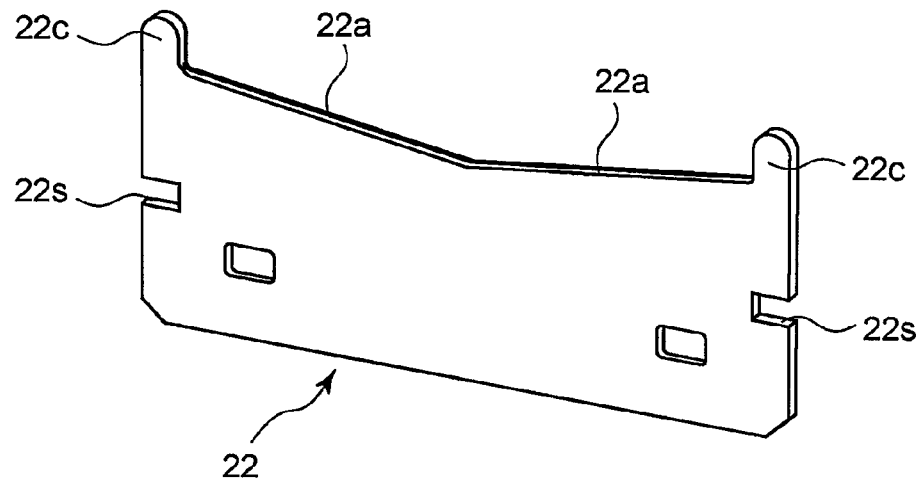
FIGS. 3A and 3B are a perspective view and a front view (plan view) of a movable blade according to a first embodiment of this invention.
Figure 3B:
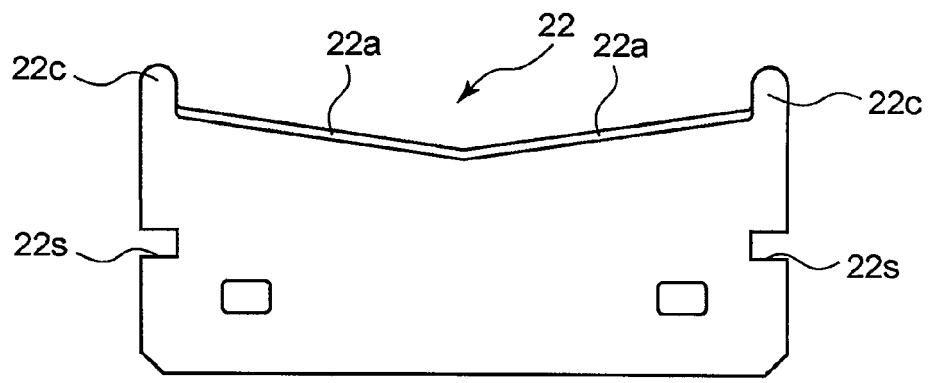

Referring to FIGS. 3A and 3B, a movable blade 22 of a first embodiment of this invention is applicable to a sheet cutting device for cutting a printed sheet, the sheet cutting device being mounted to a printer for performing printing on a sheet, the movable blade cutting the printed sheet through engagement with a stationary blade.

The movable blade 22 includes a blade edge portion 22a, a pair of guide portions 22c, and a pair of portions to be supported 22s described later. The blade edge portion 22a is formed by shaving.

The pair of guide portions 22c guides engagement with the stationary blade at the time of cutting.

Figure 2A:
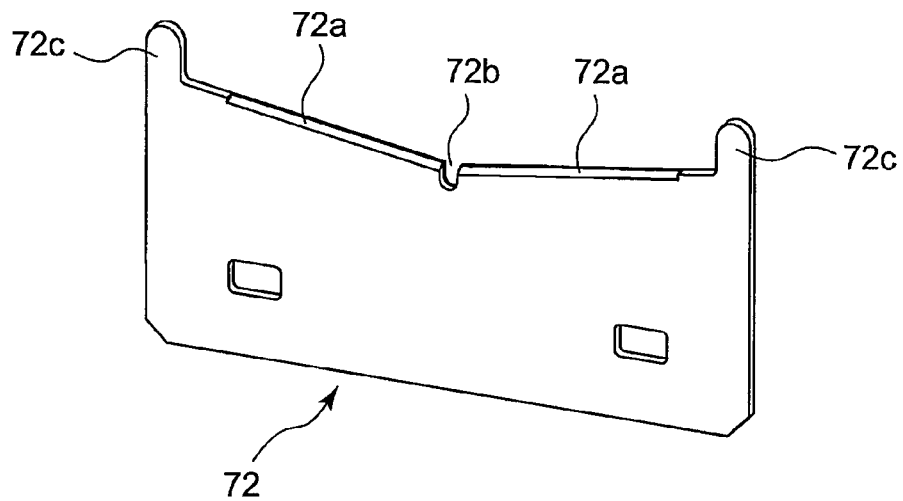
FIGS. 2A, 2B and 2C are a perspective views, a front view (plan view) and a perspective view of a main part of a movable blade illustrating the movable blade according to the related art of this invention.
Figure 2B:
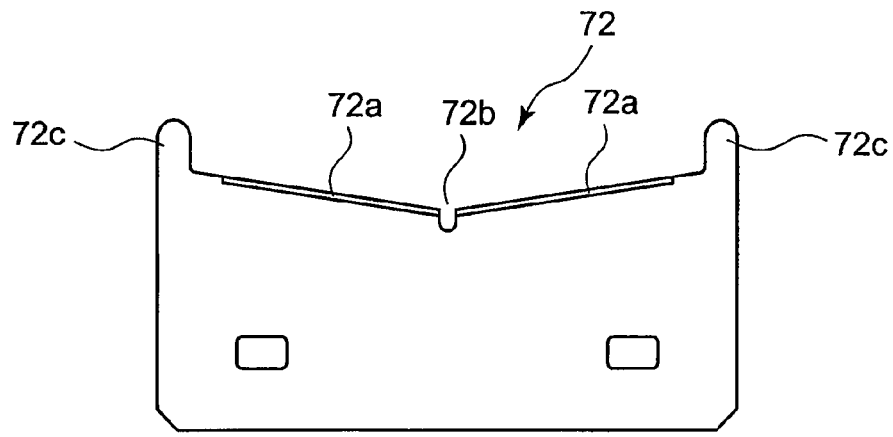
Figure 2C:
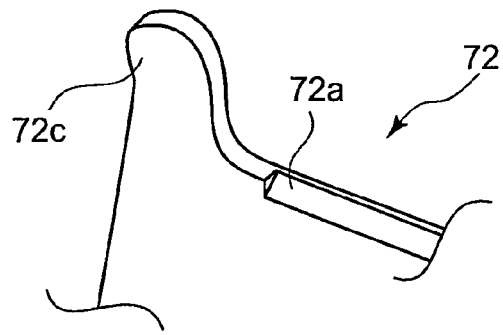
Figure 4:
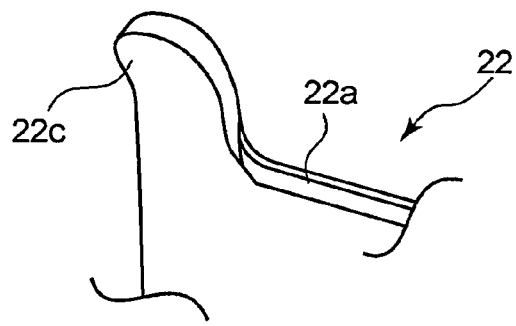
FIG. 4 is a perspective view illustrating a main part of the movable blade illustrated in FIGS. 3A and 3B.

As is clear from FIG. 4, the blade edge portion 22a is formed up to a root of the guide portion 22c, which has been impossible or difficult in the conventional case (FIGS. 2A to 2C). Therefore, the uneven wear of the stationary blade can be suppressed.

Figure 1:
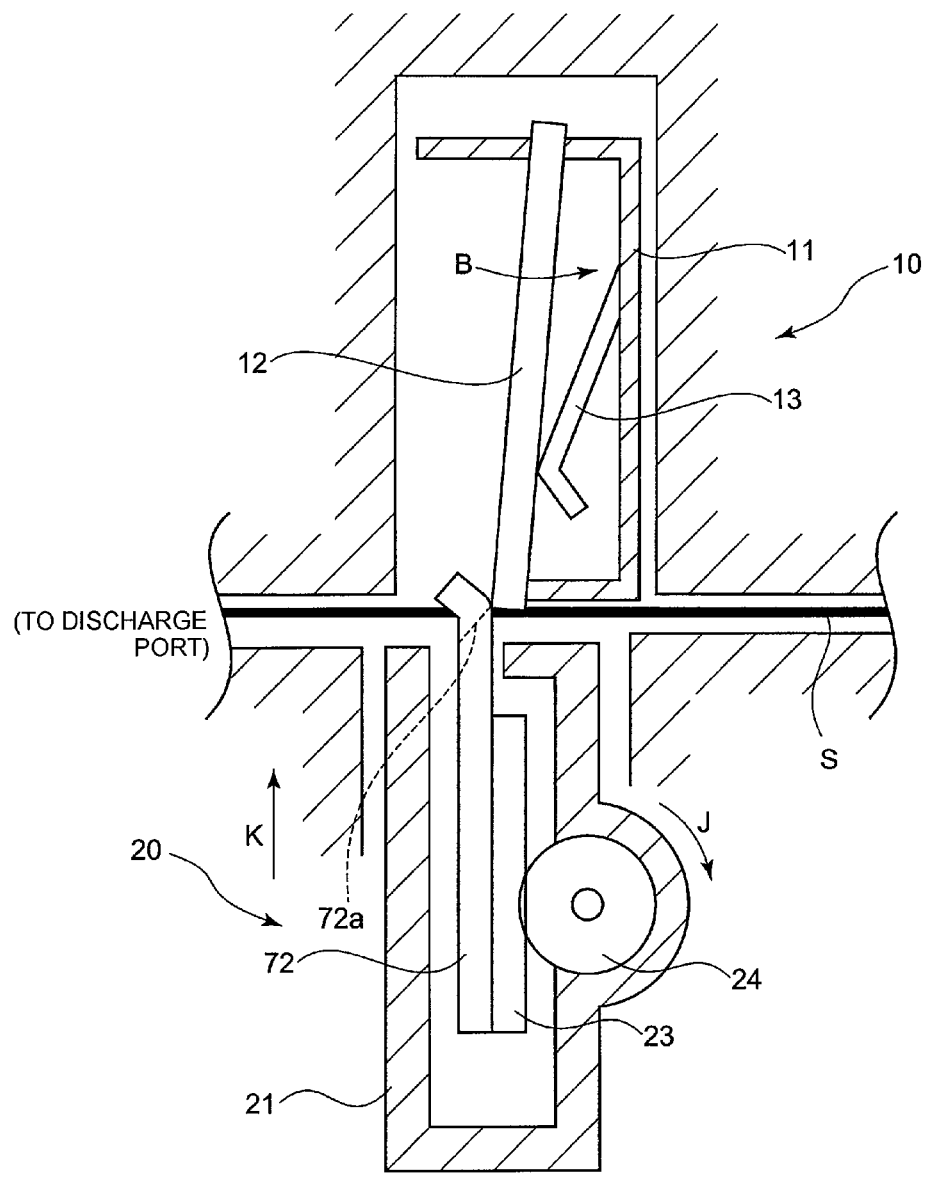
FIG. 1 is a schematic sectional view illustrating a main part of a printer as the related art of this invention.

Using FIG. 1 illustrating the related art as a reference, in the sheet cutting device of FIG. 1, the movable blade 22 can be used in place of the movable blade 72.

Next, the movable blade 22 is manufactured as follows.

First, a metal plate material is subjected to punching to form an outer shape of the movable blade.

Subsequently, an end surface of the punched metal plate material, which corresponds to a movable blade leading edge, is subjected to shaving as illustrated in FIGS. 5A to 5F.

Figure 5E:
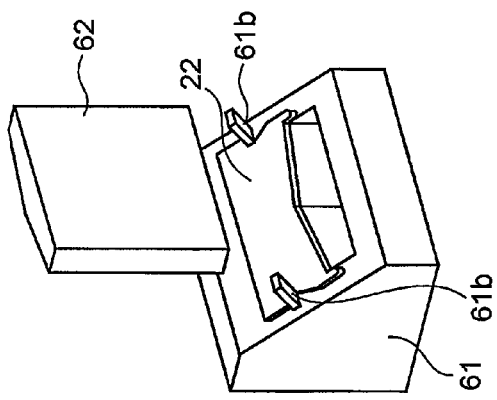
FIGS. 5A to 5F are views illustrating a shaving step performed for the movable blade illustrated in FIGS. 3A and 3B.
Figure 5F:
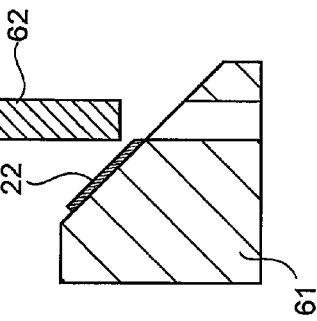
Figure 5C:
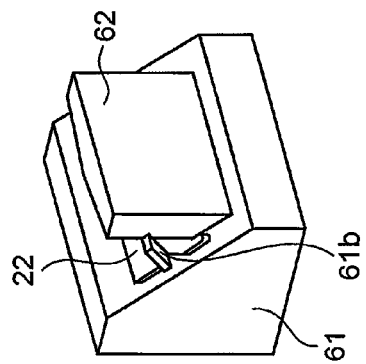
Figure 5D:
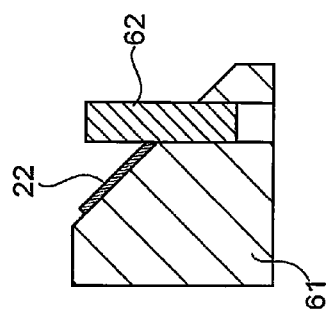
Figure 5A:
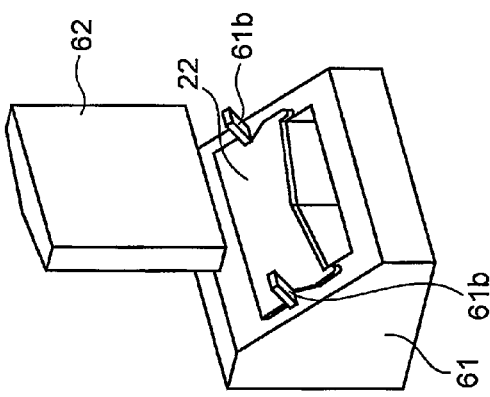
Figure 5B:
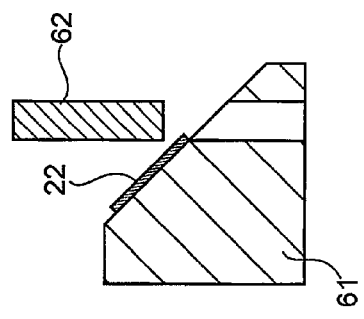

As illustrated in FIGS. 5A and 5B, the metal plate material subjected to punching (denoted by reference symbol 22 for convenience) is placed on an inclined surface of a shaving stationary die 61 in a direction illustrated in FIGS. 5A and 5B. A pair of hold pins 61b is formed on the inclined surface of the shaving stationary die 61, and the pair of portions to be supported 22s (FIGS. 3A and 3B) of the metal plate material is supported by the pair of hold pins 61b.

Next, as illustrated in FIGS. 5C and 5D, a shaving movable die 62 is pushed into the shaving stationary die 61. There is almost no gap between the stationary die and the movable die for shaving, and hence a leading edge part of the metal plate material is shaved by the shaving movable die.

Subsequently, as illustrated in FIGS. 5E and 5F, the shaving movable die 62 is pulled out from the shaving stationary die 61. In the metal plate material, the blade edge portion 22a (FIGS. 3A and 3B) is formed.

After the shaving, the pair of guide portions 22c is subjected to pressing so as to have such a shape that the pair of guide portions 22c is more separated from the stationary blade as approaching to the leading end thereof when being assembled to the sheet cutting device.

Second Embodiment

A second embodiment of this invention differs from the first embodiment in that the movable blade includes a non-cutting portion. Therefore, the same or similar parts of the first embodiment are denoted by the same or similar reference symbols, and detailed description thereof is omitted.

Figure 6A:
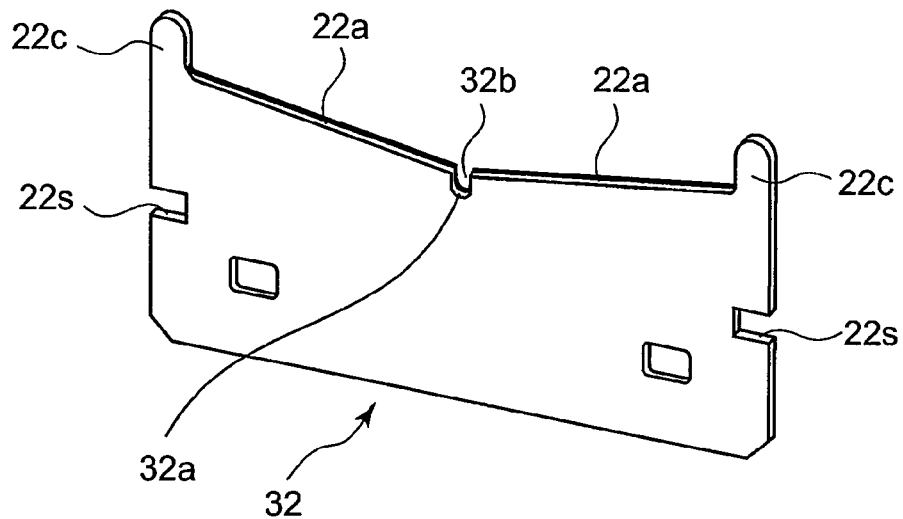
FIGS. 6A and 6B are a perspective view and a front view (plan view) of a movable blade according to a second embodiment of this invention.
Figure 6B:
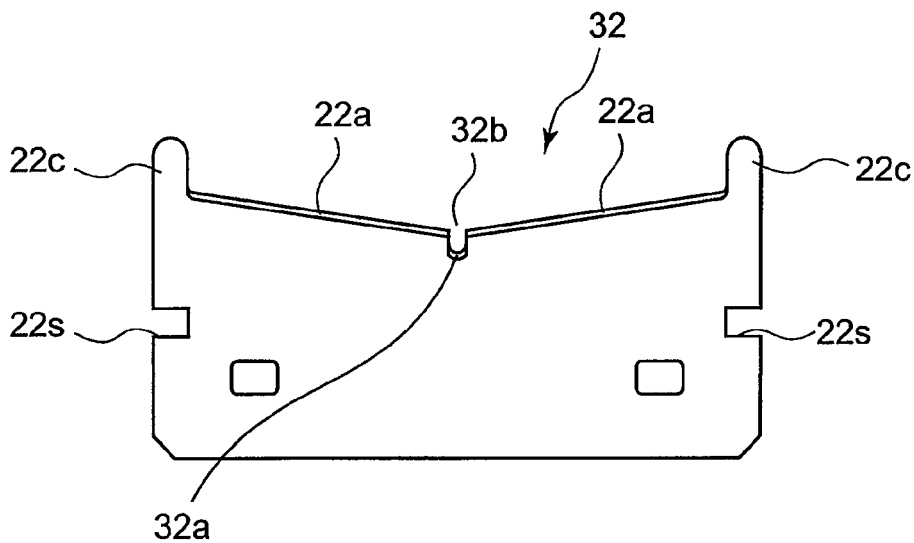

Referring to FIGS. 6A and 6B, as in the first embodiment, a movable blade 32 of the second embodiment of this invention is applicable to a sheet cutting device for cutting a printed sheet, the sheet cutting device being mounted to a printer for performing printing on a sheet, the movable blade cutting the printed sheet through engagement with a stationary blade.

The movable blade 32 includes the blade edge portion 22a, the pair of guide portions 22c, the pair of portions to be supported 22s to be supported by the shaving stationary die, and a non-cutting portion 32b.

The non-cutting portion 32b is recessed from the movable blade leading edge at a center part of the movable blade in its width direction, which corresponds to the width direction of the sheet, and is provided for preventing cutting of the sheet partially (for partial cutting). However, the non-cutting portion 32b is also used for cutting the sheet completely (for full cutting) by controlling the movable blade 32 to increase its stroke.

Figure 7:
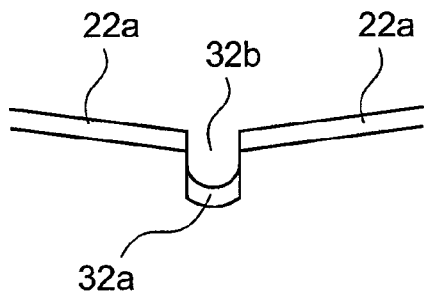
FIG. 7 is a front view (plan view) illustrating a main part of the movable blade illustrated in FIGS. 6A and 6B.

The non-cutting portion 32b is subjected to shaving as well in the same step as the blade edge portion 22a. As a result, as illustrated in FIG. 7, an inclined surface portion (blade edge portion) 32a is formed in the non-cutting portion 32b.

The inclined surface portion (blade edge portion) 32a is formed in the non-cutting portion 32b, which has been impossible or difficult in the conventional case (FIGS. 2A to 2C). With this configuration, a good cutting plane can be formed in the sheet at the time of full cutting.

Using FIG. 1 illustrating the related art as a reference, the movable blade 32 can be used in place of the movable blade 72 in FIG. 1.

Third Embodiment

A third embodiment of this invention differs from the first and second embodiments in that the pair of guide portions is subjected to shaving as well. Therefore, the same or similar parts of the first and second embodiments are denoted by the same or similar reference symbols, and detailed description thereof is omitted.

Figure 8A:
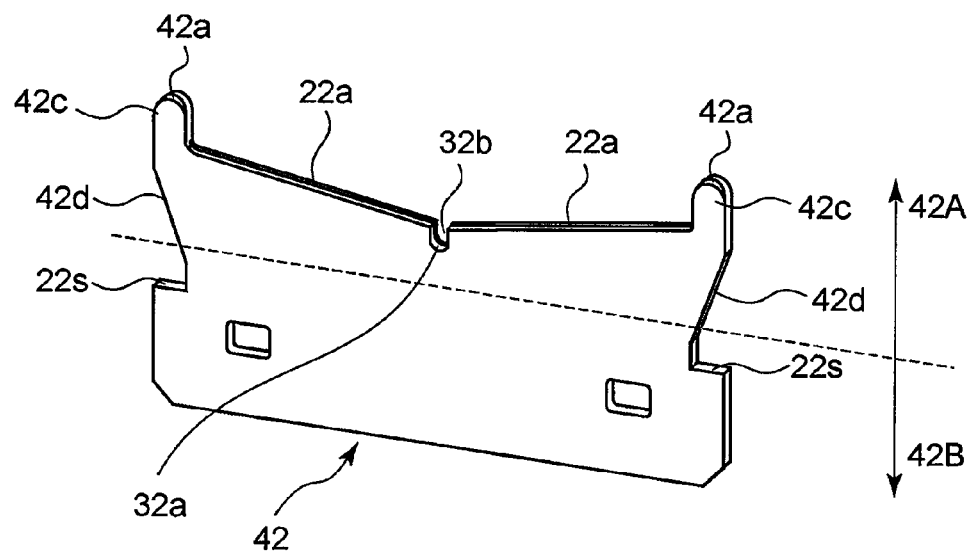
FIGS. 8A and 8B are a perspective view and a front view (plan view) of a movable blade according to a third embodiment of this invention.
Figure 8B:
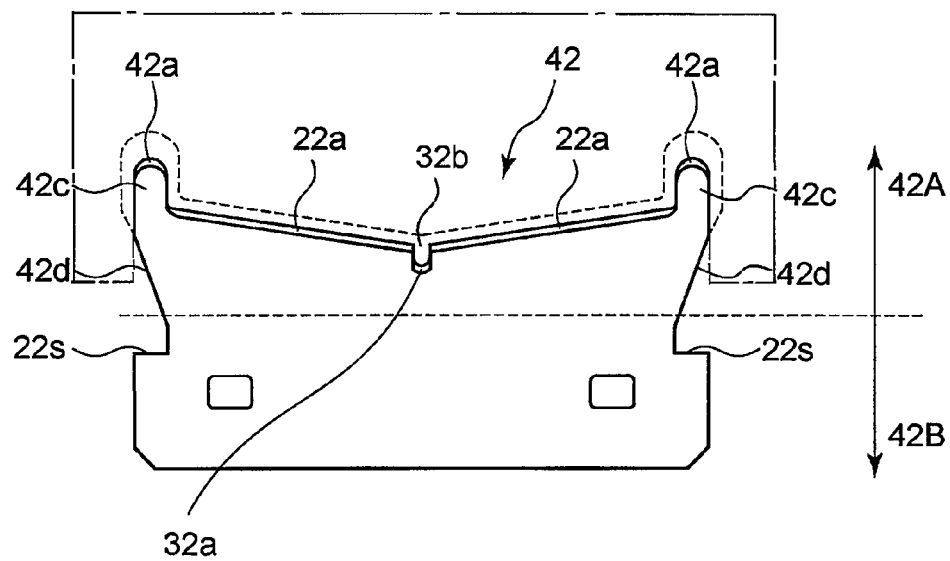

Referring to FIGS. 8A and 8B, as in the first and second embodiments, a movable blade 42 of the third embodiment of this invention is applicable to a sheet cutting device for cutting a printed sheet, the sheet cutting device being mounted to a printer for performing printing on a sheet, the movable blade cutting the printed sheet through engagement with a stationary blade.

The movable blade 42 includes the blade edge portion 22a, a pair of guide portions 42c, the pair of portions to be supported 22s to be supported by the shaving stationary die, and the non-cutting portion 32b.

The pair of guide portions 42c is protruded from the movable blade leading edge at both ends of the movable blade in its width direction, which corresponds to the width direction of the sheet, and is provided for guiding the engagement with the stationary blade at the time of cutting.

The pair of guide portions 42c is subjected to shaving as well in the same step as the blade edge portion 22a. In FIG. 8B, the broken lines around the blade edge portion 22a and the pair of guide portions 42c indicate the shape of the movable blade 42 before being subjected to shaving. As a result, in each of the pair of guide portions 42c, an inclined surface portion 42a similar to the blade edge portion is formed.

When the shaving is performed in a range including even the pair of guide portions 42c, the blade edge portion 22a of the third embodiment is formed much closer to the root of the guide portion as compared to the first and second embodiments. With this, the uneven wear of the stationary blade can be suppressed, and a good cutting plane can be formed in the sheet even in both widthwise end parts.

Further, the movable blade 42 includes a sliding region 42A which slides against the stationary blade, and a non-sliding region 42B. Further, the movable blade 42 includes, at both sides of the movable blade in its width direction, a pair of cutout portions 42d formed across the sliding region 42A and the non-sliding region 42B and formed deeper as separating from the movable blade leading edge. The pair of cutout portions 42d is formed at the time of punching for obtaining the outer shape of the movable blade, that is, before shaving.

The reason why the cutout portions 42d are formed in advance before shaving at both the sides of the movable blade in its width direction across the sliding region 42A and the non-sliding region 42B in this embodiment is as follows.

Note that, the dashed-dotted lines in FIG. 8B indicate the shape of the shaving movable die. In order to form the blade edge portion 22a much closer to the root of the guide portion as compared to the first and second embodiments, it is necessary to perform shaving up to the side surfaces of the movable blade, but when the cutout portions 42d are not formed, a step is formed at a boundary between a side surface of the movable blade, which is subjected to the shaving, and a side surface of the movable blade, which is not subjected to the shaving. When this step is present, there is a risk that the sliding operation of the movable blade is impaired (interference between the step of the side surface of the movable blade and the stationary blade, or interference between the step of the side surface of the movable blade and the frame around the movable blade). The cutout portions 42d are formed at both the sides of the movable blade in the width direction in order to avoid this risk.

When the cutout portions 42d are formed at both the sides of the movable blade in the width direction, no step is formed at the boundary between the side surface of the movable blade, which is subjected to the shaving, and the side surface of the movable blade, which is not subjected to the shaving.

INDUSTRIAL APPLICABILITY

This invention has been described by means of embodiments so far. However, this invention is not limited to those embodiments and various modifications can be made thereto without departing from the technical scope described in the claims in this application.

This application is based upon and claims the benefit of priority from Japanese Patent Application No. 2010-193168, filed on Aug. 31, 2010, the entire disclosure of which is incorporated herein by reference.

The invention claimed is:

1. A method of manufacturing a movable blade, which is mounted to a printer for performing printing on a sheet and which cuts the printed sheet through engagement with a stationary blade, the method comprising forming, at a part including a movable blade leading edge which engages with the stationary blade, a blade edge portion which is thinned toward the movable blade leading edge, wherein the movable blade further comprises a pair of guide portions protruded from the movable blade leading edge at both ends of the movable blade in the width direction, which corresponds to a width direction of the sheet, the pair of guide portions guiding the engagement with the stationary blade at the time of cutting, wherein the movable blade further comprises a sliding region which slides against the stationary blade, and a non-sliding region, wherein the forming comprises forming the blade edge portion by shaving, wherein the method further comprises:

subjecting the pair of guide portions to the shaving as well in the same step as the blade edge portion, and forming a pair of cutout portions at both sides of the movable blade in the width direction across the sliding region and the non-sliding region, the pair of cutout portions being formed so that a depth of the cutout portions towards a center of the movable blade in a width direction of the movable blade is increased in a direction opposite to the movable blade leading edge, the forming the pair of cutout portions preceding the shaving.

2. A method of manufacturing a movable blade according to claim 1, wherein the movable blade comprises a non-cutting portion recessed from the movable blade leading edge at the center part of the movable blade in the width direction, which corresponds to the width direction of the sheet, the non-cutting portion preventing cutting of the sheet partially, and wherein the method further comprises subjecting the non-cutting portion to the shaving as well in the same step as the blade edge portion.

* * * * *